July 5, 1949.   R. F. WILD ET AL   2,475,576
MOTOR CONTROL SYSTEM WITH STRAY SIGNAL ELIMINATION
Filed Feb. 10, 1948
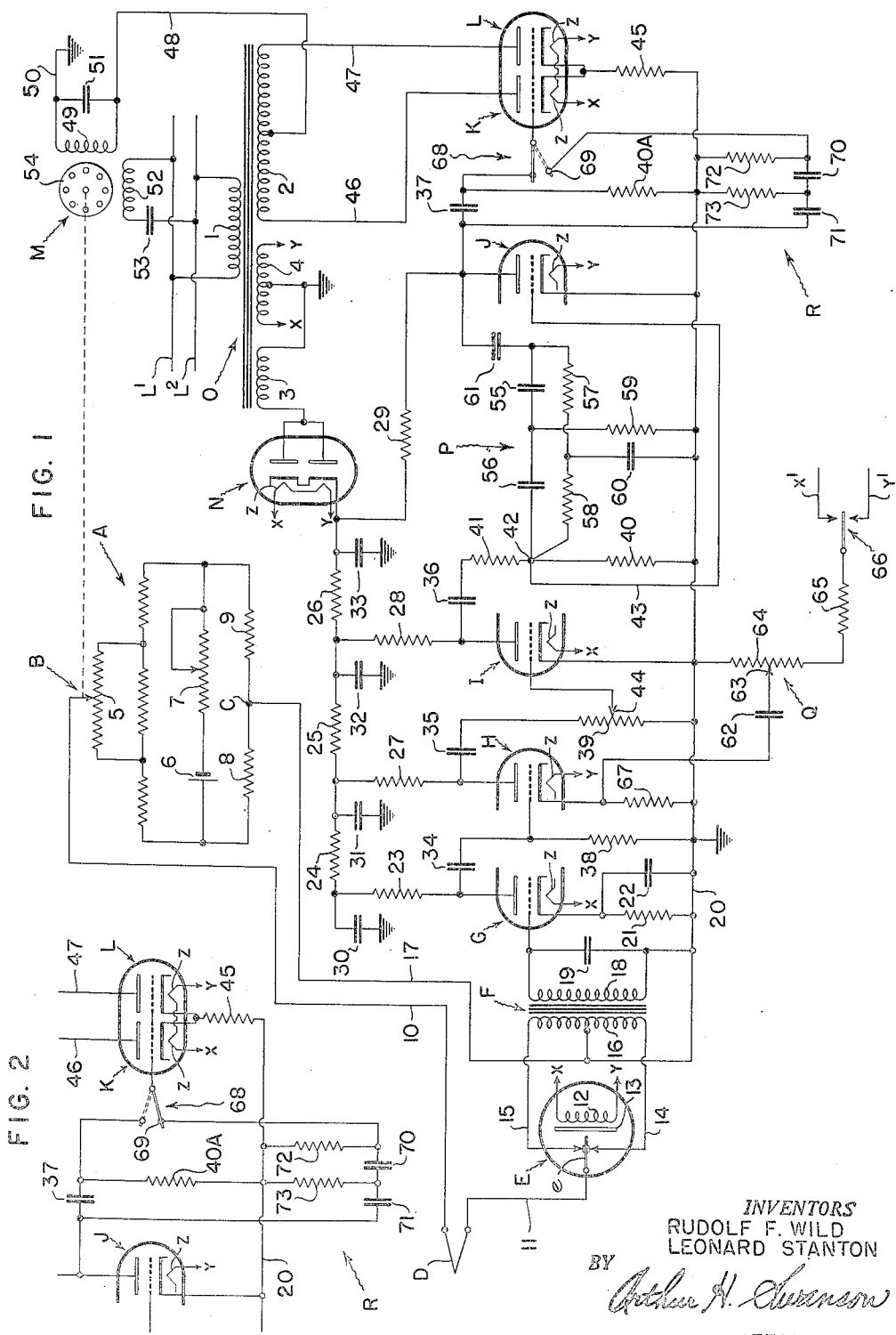
INVENTORS
RUDOLF F. WILD
LEONARD STANTON
BY Arthur H. Swanson
ATTORNEY.

Patented July 5, 1949

2,475,576

UNITED STATES PATENT OFFICE 2,475,576

MOTOR CONTROL SYSTEM WITH STRAY SIGNAL ELIMINATION

Rudolf F. Wild, Wilmington, Del., and Leonard Stanton, Philadelphia, Pa., assignors, by mesne assignments, to Minneapolis-Honeywell Regulator Company, Minneapolis, Minn., a corporation of Delaware Application February 10, 1948, Serial No. 7,478

19 Claims. (Cl. 318—28)

The general object of the present invention is to provide an improved electronic amplifying system. A more specific object of the invention is to provide an improved low level, high gain amplifier for use in self-balancing measuring apparatus including a voltage amplifier and motor drive system of the widely used type disclosed in the Wills Patent 2,423,540 of July 8, 1947.

The motor drive system disclosed in said patent is adapted to operate a reversible two phase electric motor as required to rebalance a self-balancing measuring system, usually of the potentiometer type, when the system is unbalanced as a result of a variation in the value of a quantity being measured. Said motor drive system includes conversion means by which a minute unidirectional voltage difference is converted into an alternating current signal of some predetermined frequency. The minute unidirectional voltage is usually the difference between the voltage of a thermocouple or other voltage source to be measured and the small potential difference between two points of a measuring bridge circuit. Said predetermined frequency customarily is, and is hereinafter assumed to be, 60 cycles per second. One of said two circuit points is the point along a slide wire resistance included in the measuring bridge circuit which is engaged by a slider contact. The alternating current signal is of one phase or of a second phase, displaced 180° from said one phase, accordingly as said system is unbalanced in one direction or in the opposite direction.

Said alternating current signal is amplified by a multi-stage voltage amplifier, and the amplified signal is impressed on the control grids of a pair of power amplifying, motor driving triodes, each supplied with 60 cycle alternating anode voltage 180° out of phase with the anode voltage supplied to the other triode. Said two phase motor has a power winding energized by a source of 60 cycle alternating current, and has a control winding included in and energized by the output circuits of the two triodes. The latter cooperate, when said system is unbalanced, to supply 60 cycle alternating current to said control winding of a phase which leads or lags the current flow in the power winding and thereby causes the motor to rotate in one direction or in the other direction, depending on the direction of system unbalance. The motor rebalances the measuring circuit by adjusting the slider contact along the slide wire resistance included in the measuring circuit.

The multi-stage voltage amplifier in extensive commercial use in the apparatus described above comprises three stages, each including a triode. There is, and long has been, need for greater gain in the voltage amplifier of said motor drive system, and various unsuccessful attempts have been made to add a fourth stage of amplification to the standard three stage arrangement. Those attempts have not been successful, primarily because they have resulted in an objectionable increase in the amplitude of no-drive stray signal components transmitted from the voltage amplifier to the power amplifier. The primary objects of the present invention are to provide means for substantially increasing the voltage amplifier gain without objectionably increasing the no-drive stray signal components in the voltage amplifier output circuit.

The no-drive stray signal components usually include 120 cycle components, due to the operation of the conversion means and to coupling effects from the cathode heater of the first stage triode, and stray signal components including 60 cycle out-of-phase components and other random frequency components which singly or collectively serve either to overload the final voltage amplifier stage or to make it impossible to obtain the maximum energy unbalance in the power amplifier stage required to obtain maximum motor torque. The 60 cycle stray signals are due to magnetic and capacitive pickup and to leakage effects, and in any case may have components which are out of phase with the useful motor drive signal. The source of the random frequency noise components is not clearly known, but their presence is always noticed in this type of amplifier.

A specific object of the present invention is to provide simple and effective means for injecting into an early stage of the voltage amplifying system an artificial 60 cycle bucking signal of such phase and magnitude as to eliminate all or substantially all of the no-drive 60 cycle stray signal components passing into this amplifier stage. To this end, we provide a voltage divider and a phase shifting network adapted to be supplied with alternating voltage from a transformer secondary winding, included in the system, in such a manner that the phase of the injected signal may be that needed to oppose the 60 cycle stray signal. The magnitude of the bucking voltage may be varied to cancel out substantially all of the no-drive 60 cycle stray signals present in the amplifier.

Another specific object of the invention is to provide effective means for suitably eliminating or reducing the 120 cycle and other random frequency stray signals from the voltage amplifier. For the attainment of this object we make use of a degenerative coupling, comprising a tuned resistance-capacity filter network connected between the output and input circuits of one of the amplifier stages, which is preferably the final voltage amplifier stage. This network is tuned for maximum attenuation at 60 cycles so that the associated voltage amplifier stage selectively amplifies 60 cycle signals to the maximum extent, and amplifies signals of all other frequencies to a lesser degree. Through the conjoint effect of the means for injecting an artificial 60 cycle no-drive stray bucking voltage in one stage of the voltage amplifying system, and the means for degeneratively coupling the output and input circuits of a later voltage amplifier stage, it is possible to greatly reduce, if not to eliminate completely both the no-drive 60 cycle stray amplifier signals and the other stray amplifier signals differing in frequency from 60 cycles, particularly stray signals which are of random nature insofar as recurrence and phase are concerned. In the preferred form of the invention, we add a fourth voltage amplifier stage to the three stage voltage amplifier of the standard commercial form, and also increase the anode voltage of the voltage amplifying valves and thereby obtain a voltage amplification about thirty-five times the voltage amplification obtained with the above-mentioned amplifier unit of standard form in commercial use heretofore.

The various features of novelty which characterize our invention are pointed out with particularity in the claims annexed to and forming a part of this specification. For a better understanding of the invention, however, its advantages, and specific objects attained with its use, reference should be had to the accompanying drawings and descriptive matter in which we have illustrated and described a preferred embodiment of the invention.

Of the drawings:

Fig. 1 is a diagram illustrating a preferred form of the invention; and

Fig. 2 is a reproduction of a portion of the Fig. 1 diagram with a switch of that diagram shown in a different adjustment position.

In the embodiment of the invention illustrated in Fig. 1, A represents a potentiometric measuring circuit, or network, of conventional form, shown as comprising a slide wire resistance 5 engaged by a slider contact B, and a fixed point C which normally differs in potential from the slider contact B by an amount depending on the adjustment of the latter. A thermocouple D is connected between the slider contact B and network point C in series with portions of vibrator and transformer elements E and F, respectively. Those elements collectively form the conversion portion of the amplifying and motor control apparatus.

In the balanced condition of the measuring network, the D. C. voltage difference between the slider contact B and the point C is equal in magnitude to the thermocouple voltage, but is opposite in direction to the latter. When a change in thermocouple temperature and voltage occurs, the network is unbalanced and current flows through the thermocouple. Thereupon the conversion elements E and F cooperate to impress an alternating current rebalancing signal on the input circuit of the electronic amplifying system. The rebalancing signal is proportional in magnitude to said voltage difference, is of predetermined frequency, and is of one phase or of the opposite phase accordingly as the network unbalance is in one direction or in the opposite direction.

The electronic amplifying system comprises voltage amplifying valves G, H, I and J, by which the signal is successively amplified, a rectifier valve N which supplies unidirectional current to the anodes of the valves G, H, I and J, and motor driving valves K and L, on the control grids of which the signal amplified by the valves G, H, I and J is impressed. The output circuits of the valves K and L form the output circuit of the electronic system, and energize the control winding of a reversible electric motor M which operates to effect rebalancing adjustments of the slider contact B.

The motor M has a power winding 52 which is energized from alternating current supply conductors L' and L². The latter also supply current to the primary winding 1 of a transformer O. The latter has a secondary winding 2 supplying current to the anodes of the valves K and L, and has another secondary winding 3 supplying current to the anode circuit of the rectifier valve N. Transformer O also has a third secondary winding 4 which supplies energizing current to the cathode heaters Z of valves G, H, I, J, K, L and N, to the converter element E, and to the conductors X' and Y' hereinafter described. In the arrangement shown in Fig. 1, the transformer O is operated as a 60 cycle transformer but preferably is structurally like a 25 cycle transformer, since the relatively greater core section of the 25 cycle transformer results in a lower leakage or stray magnetic flux, and a consequent reduction in the stray 60 cycle voltage induced in the system by the transformer.

The previously mentioned apparatus elements are combined for the purposes of the present invention with elements P, Q and R, shown in Fig. 1, as is hereinafter explained in detail.

As illustrated, the potentiometric network A is of conventional split potentiometer type, comprising three branches connected in parallel. One of said branches includes the slide wire resistance 5 engaged by the slider contact B and along which the latter is adjusted by the motor M, the second branch includes an energizing battery 6 and a calibrating rheostat 7, and the third branch includes resistors 8 and 9 at opposite sides of the previously mentioned network point C. The thermocouple D has one terminal connected by a conductor 10 to the slider contact B, and has its second terminal connected to the network point C by means including a conductor 11, the vibrating armature or reed e of the conversion element or vibrator E, and other conducting elements. The vibrator E includes an electro-magnetic coil or winding 12 having its terminals connected to the terminals X and Y of the transformer secondary winding 4. The coil 12 and associated electromagnetic core 13 cause the reed e to vibrate with a frequency corresponding to the frequency of the alternating current supplied by the conductors L' and L². As the reed e vibrates, it alternately engages stationary contacts, one of which is positioned at each side of the reed e. One of these stationary contacts is connected by a conductor 14 to one end, and the other stationary contact is connected by conductor 15 to the second end, of the energizing or primary winding 16 of the transformer element F. A conductor 17 connects a center-tap connection on the winding 16 to the potentiometer network point C.

Unidirectional currents which flow through the center-tap conductor 17 and alternately flow through the two sections or halves of the winding 16 and through the conductors 14 and 15, respectively, induce an appropriate rebalancing signal in the secondary winding 18 of the transformer F. Thus, whenever the voltage of the thermocouple D is not equal and opposite to the potential difference between the slider contact B and point C, there is induced in the secondary winding 18 of the transformer F an alternating current signal proportional in magnitude to the inducing current and of the same frequency as the current flowing in the winding 12 of the vibrator element E. The current so induced is in phase with, or is 180° out of phase with, the voltage across the supply conductors L' and L², accordingly as the voltage of the thermocouple D exceeds, or is less than, the potential difference between the slider contact B and potentiometer network point C.

The transformer secondary winding 18 is shown as having one terminal connected to ground through a grounding conductor 20, through which numerous other ground connections, hereinafter mentioned, are made. The center-tap of the primary winding 16 is also grounded through the conductor 20. The second terminal of the winding 18 is connected to the control grid of the valve G and is also connected to ground through a condenser 19. The cathode of the valve G is connected to ground through a cathode bias resistor 21, and a cathode bypass condenser 22 connected in parallel with resistor 21. The cathode of the valve H is connected to ground through a cathode bias resistor 67, and the cathodes of the valves I and J are connected directly to the grounding conductor 20. Plate load resistor 23 and filter resistors 24, 25 and 26 are connected in series in the order stated between the anode of the valve G and the cathode of the rectifier valve N. The cathode of the valve N is connected to the anode of the valve H through the filter resistors 26 and 25 and a plate load resistor 27, is connected to the anode of the valve I through the filter resistor 26 and a plate load resistor 28, and is connected to the anode of the valve J through a plate load resistor 29. The valve N, as shown, is a rectifier with two anodes, and may be of the commercially available type 6X5. Both anodes of the valve N are connected to one terminal of the transformer secondary winding 3. The second terminal of the winding 3 is connected to ground and is therefore connected to the cathode of the valve N through the plate circuits of the valves G, H, I and J, each of which has its respective cathode connected to ground. The junction point of the resistors 23 and 24 is connected to ground through a filter condenser 30. Similarly, the common junction point of the resistors 24, 25 and 27 is connected to ground by a second filter condenser 31. A third filter condenser 32 connects the common junction of the resistors 25, 26 and 28 to ground. A fourth filter condenser 33 connects the junction of the resistors 26 and 29 to ground. The filter circuit comprising the condensers 30, 31, 32 and 33 and resistors 24, 25, and 26 connected thereto smooths out the ripple in the current supplied to the anodes of the valves G, H, I, and J. The filter circuit is desirably made effective to eliminate practically all of the ripple from the current supplied to the anode of the valve G, but need not effect an equally complete elimination of ripple from the current supplied to the anodes of the valves H, I and J, where a small ripple in the anode current is relatively unimportant.

The output circuit of the valve G is resistance-coupled to the input circuit of the valve H, the output circuit of the valve H is resistance-coupled to the input circuit of the valve I, and the output circuit of the valve I is resistance-coupled to the input circuit of the valve J. The output circuit of the valve J is resistance-coupled to the input circuit of each of the valves K and L in normal operation, since in normal operation a switch 68 is in the position shown in full lines in Fig. 1 and in dotted lines in Fig. 2. The resistance-couplings just described include coupling condensers 34, 35, 36 and 37, respectively, connected to ground by respective grid resistors 38, 39, 40 and 40A. The ground connection to the coupling condenser 36 also includes an isolation resistor 41. The connection between the output circuit of valve I and the input circuit of the valve J includes a conductor 43 connecting the junction point 42 of the resistors 41 and 40 to the control grid of the valve J. The control grid of the valve H is connected to the output circuit of the valve G between the condenser 34 and resistor 38. The control grid of the valve I is connected to a slider contact 44 adjustable along the resistor 39. The position of the slider 44 along the resistor 39 determines the sensitivity of the amplifier. The control grids of the valves K and L are connected through the switch 68 to the portion of the output circuit of the valve J which connects the condenser 37 to the resistor 40A.

The cathodes of the valves K and L are connected to ground through a cathode bias resistor 45. The anodes of the valves K and L are connected by conductors 46 and 47, respectively, to the left and right ends of the secondary winding 2 of the transformer O. A conductor 48 connects the center-tap, or midpoint, of the secondary winding 2 to one terminal of the control winding 49 of the motor M. The other terminal of that winding is connected to ground by a conductor 50. A condenser 51 is connected in parallel with the winding 49. The power winding 52 of the motor M has one terminal directly connected to the supply conductor L', and has its second terminal connected to the supply conductor L² through a condenser 53.

For its intended use the motor M may well be of the form diagrammatically shown in the drawing, comprising the control and power windings 49 and 52, respectively, in which the currents flowing are of displaced phases. The windings are arranged and energized to create a rotating field for the rotor 54 of the motor M, which rotor may have a squirrel cage winding. The resultant energizing voltage applied to the motor control winding 49 is approximately in phase with, or is displaced 180° from, the phase of the voltage between the supply conductors L' and L², depending upon the direction of potentiometeric network unbalance. Due to the action of the condenser 53, the current flowing through the power winding 52 is in phase with the voltage of the alternating current supply conductors L' and L². Due to the action of the condenser 51, the current which flows in the control winding 49, however, always lags, by substantially 90°, the voltage applied to this winding.

The windings 49 and 52 are thus energized with currents which are 90° apart in phase and thus cooperate to establish a magnetic field revolving in one direction or in the opposite direction, depending on the direction of network unbalance.

In the normal operation of the apparatus shown in Fig. 1, disregarding the effect of signals not due to changes in the voltage of the thermocouple D, the measuring apparatus is balanced when the thermocouple D connected to the measuring network is at a constant temperature. The position of the contact B along the slide wire resistance 5 then provides a measure of the thermocouple voltage and temperature, and no rebalancing signal is then impressed on the amplifier input circuit. When a change in the thermocouple temperature and voltage occurs, the apparatus is unbalanced, and a rebalancing signal is impressed on the amplifier input circuit. The phase and magnitude of the rebalancing signal are dependent on the direction and extent of network unbalance. The amplified rebalancing signal produces a current flow in the control winding 49 of the motor M which combines with the current flow through the power winding 52 to create a revolving magnetic field producing motor rotation in the direction to move the slider contact B toward the position in which it will rebalance the apparatus.

As balance is attained, the rebalancing signal fades away and the rotation of the rotor 54 is interrupted, although direct currents, and alternating currents of a frequency double that of the current supplied by the conductors L' and L², flow through the winding 49 during periods in which the rebalancing signal is non-existent. Further explanations with respect to the apparatus elements shown in Fig. 1 and utilized in the normal measuring operation of the apparatus appear unnecessary to a proper understanding of the invention disclosed and claimed herein, particularly since conversion type potentiometers including conversion means and voltage amplifying and motor drive systems of the character shown herein are not only disclosed and claimed in the above-mentioned Wills patent, but are also in general use in this country.

The apparatus disclosed in the aforementioned Wills patent includes no elements corresponding to the elements P, Q, and R of Fig. 1, which are shortly to be described. Structurally, the apparatus shown in said Wills patent also differs from that disclosed in Fig. 1 in that the apparatus of the Wills patent employs no fourth stage of voltage amplification equivalent to the present one including the valve J, but does include a valve like the valve J herein and uses that valve as a rectifier to supply anode voltages to valves corresponding to valves G, H and I. In said Wills patent the anode of the valve corresponding to the valve I herein is connected through a condenser, like the condenser 36, directly to the control grids of motor drive valves like the valves K and L.

In the apparatus shown in Fig. 1, the valves G and H may take the form of halves of one twin triode tube, and valves I and J may form a second twin tube, each of the commercially available type 7F7. The valves K and L of Fig. 1 may form parts of a twin triode tube of the commercially available type 7N7.

The values of the resistors and condensers in the output circuits of the voltage amplifier valves G, H, I and J may be those customarily employed in resistance-coupled voltage amplifiers of the general type shown. Thus, for example, each of the resistors 23, 27, 28 and 29 may have a resistance of 1 megohm; the resistor 24 may have a resistance of 150,000 ohms; each of the resistors 25 and 26 may have a resistance of 50,000 ohms; the resistor 21 may have a resistance of 10,000 ohms and each of the resistors 38, 39 and 40 may have a resistance of 1 megohm. Resistor 40A may have a resistance of 0.5 megohm. Also, for example, the condensers 30, 31 and 32 may each have a capacity of 10 microfarads; the condenser 33 may have a capacity of 8 microfarads; each of the condensers 34, 35, 36 and 37 may have a capacity of 0.05 microfarad; and the condenser 22 may have a capacity of 20 microfarads.

The 3500 percent increase in amplifier gain obtainable with the apparatus shown in Fig. 1 herein over the gain of the amplifier disclosed in said Wills patent is directly due in part to the use of the valve J in a fourth voltage amplifying stage, and in part to the fact that the rectifier valve N is adapted to supply a higher anode voltage than is furnished by the valve J when used as a rectifier in the standard commercial form of the apparatus disclosed by the said Wills patent. The 3500 percent increase in amplifier gain obtainable with the apparatus shown in Fig. 1 is made practical and useful by the corrective actions of the elements P and Q in reducing or eliminating no-drive stray signal effects in the apparatus.

The circuit element or device P consists of a parallel-T resistance-capacitance frequency-selective network of known type. Such networks are discussed, for example, in some detail by Leonard Stanton, one of the applicants herein, in the "Proceedings of the Institute of Radio Engineers and Waves and Electrons," vol. 34, No. 7, for July, 1946, on pages 447–456. Such a network is referred to commonly, and hereinafter, as a "parallel T RC filter network." The parallel T RC filter network of the device P is included in a degenerative feed-back connection between the anode and the control grid of the valve J. The parallel T RC filter network comprises condenser and resistor elements 55—60. One terminal of said network is connected to the anode of the valve J through a coupling condenser 61, and its second terminal is connected to the junction point 42, and thereby through the conductor 43 to the control grid of the valve J. Said second terminal is also connected through the junction 42 and resistance 40 to ground, but is practically isolated, by the isolation resistor 41, from the condenser 36 and the anode of the valve I. Condensers 55 and 56 are connected in series with one another between the condenser 61 and the junction point 42, and resistors 57 and 58 are also connected in series with one another between the condenser 61 and junction point 42. The connected terminals of the condensers 55 and 56 are connected to ground through a resistor 59. The connected terminals of the resistors 57 and 58 are also connected to ground by condenser 60.

The parallel T RC filter network is tuned, by the selection of the values of its components, to attenuate 60 cycle signals, while passing 120 cycle signals and signals of other frequencies. In consequence, the device P operates to feed back from the plate circuit to the control grid of the valve J all signals having frequencies other than 60 cycles, but does not feed back 60 cycle signals to any substantial extent. Since the plate and grid signals of the amplifier valve J are inherently 180° out of phase with each other, the signals fed back from the plate circuit to the grid of the valve J oppose corresponding signals which the output circuit of the valve I impresses on the input circuit of the valve J. This results in a substantial reduction of signals other than 60 cycle signals reaching valves K and L from valve J. The reduction of 120 cycle signals and stray signals of frequencies other than 60 cycles substantially eliminates the undesirable effects which would otherwise be produced by these signals.

For its isolation purpose, the resistor 41 may have a resistance value of 250,000 ohms. For its purpose in attenuating 60 cycle signals while freely passing and feeding back other signals, the circuit elements of the parallel T RC filter network may have values approximately as follows: The condensers 55 and 56 may each have a capacity of 0.005 microfarad; the condenser 60 may have a capacity of 0.01 microfarad; the resistors 57 and 58 may each have a resistance of 0.5 megohm; and the resistor 59 may have a resistance of 0.25 megohm. The coupling condenser 61 may well have a capacity of 0.05 microfarad.

As was mentioned hereinbefore, the 120 cycle stray signals which are substantially eliminated by the action of the device P originate as a result of the operation of the conversion elements E and F. This can be explained as follows. Due to the nature and use of the potentiometric measuring apparatus disclosed herein, the potentiometric measuring network portion thereof, the thermocouple D, the thermocouple leads or conductors 10 and 11, and other portions of the apparatus are subjected to the effects of stray alternating electrical and magnetic fields. Such stray fields cause stray alternating current signals, usually of the frequency of the current supplied by the conductors L' and L², to be introduced into the measuring apparatus circuits. In the present example, these stray signals have a frequency of 60 cycles per second. All of such 60 cycle stray signals which are induced in the portion of the apparatus which is connected ahead of the input transformer secondary winding 18 are subjected to the 60 cycle chopping action of the vibrator E. As a result, these 60 cycle stray signals appear in the secondary winding 18 as stray 120 cycle signals, which are later substantially eliminated by the action of the device P.

Without this action of the conversion means in changing the induced 60 cycle stray signals into corresponding 120 cycle stray signals, the components of the 60 cycle stray signals which were in phase with motor drive or rebalancing signals would cause objectional driving of the rebalancing motor M. The 120 cycle stray signals which are produced as above described, however, do not produce an effect tending to cause motor drive. These 120 cycle signals do, on the other hand, tend to overload the amplifier and detrimentally affect its operation, as explained hereinbefore, thus producing the need for the device P.

While the parallel T RC filter network does not feed back and thus eliminate any appreciable amount of 60 cycle signals, the no-drive 60 cycle stray signal components are substantially eliminated by the device Q. The latter comprises a bucking circuit operative, as shown, to buck out or cancel 60 cycle, no-drive stray signal components by injecting a bucking voltage into the cathode circuit of the valve H. The bucking circuit includes a phase shifting condenser 62 having one terminal connected to the cathode of the valve H and having its other terminal connected to a slider contact 63 adjustable along a resistor 64. The latter has one terminal connected to ground and has its other terminal connected by a resistor 65 to the movable switch blade of a single pole double throw switch 66 which serves as a phase control. In one position of the switch blade, the latter is connected through a terminal of the switch 66 and a conductor X' to the end terminal X of the transformer secondary winding 4. In its second position, the movable switch blade of the switch 66 is connected through a terminal of the switch 66 and a conductor Y' to the terminal Y of the transformer secondary winding 4. To avoid complicating the drawings, portions of the conductors X' and Y' are omitted, as are the conductors connecting the terminals X and Y of the winding 4 to the terminals of the various cathode heaters Z. The midpoint or center-tap of the secondary winding 4 is connected to ground, and the effect of adjusting the switch 66 to connect the resistor 65 to one or the other of the terminals of the winding 4 is a 180° shift in phase of the bucking voltage impressed on the cathode circuit of the valve H.

Suitable values for the condenser 62 and resistors 64 and 65 are 0.05 microfarad, 50 ohms and 100 ohms, respectively. The circuit through which the bucking voltage is thus injected into the amplifier stage H can be traced from one of the terminals X or Y of the winding 4 through the corresponding conductor X' or Y' and the associated switch terminal, resistor 65, the portion of the resistor 64 between the resistor 65 and the slider contact 63, the condenser 62, and cathode bias resistor 67 to ground and through the latter to the center-tap of the transformer secondary winding 4. The cathode bias resistor 67 may have a resistance of 500 ohms. The voltage between ground and either terminal X or Y of the transformer secondary winding 4 is approximately 3 volts RMS.

With the bucking voltage introduced between the cathode of the valve H and ground, across the cathode resistor 67, it produces its maximum possible effect on the relative potentials of the cathode and control grid of the valve H, since its effect is not reduced as a result of its production of current flow in a circuit not including said cathode and control grid, as it would be, for example, if the bucking voltage were injected into the connection between the control grid of the valve H and ground.

As was mentioned hereinbefore, the device Q is provided for the purpose of cancelling the 60 cycle no-drive stray signals which appear in the voltage amplifier. It has been found that these stray signals are substantially 90° out of phase with the useful 60 cycle motor drive signals. To effect cancellation of such stray signals, the bucking voltage employed must be 90° out of phase with the reference voltage of the supply conductors L' and L². This 90° phase shift is provided by the condenser 62. The bucking voltage must also be 180° out of phase with the 60 cycle stray signal which it is to cancel, and this phase relationship is obtained by proper positioning of the switch 66.

The previously mentioned circuit element R is a 90° phase shifting network provided for use in quickly and easily determining whether the blade of the switch 66 should be moved into the position in which it is connected to the conductor X', or into the position in which it is connected to the conductor Y'. The device R is also employed in determining the most advantageous setting of the slider contact 63 along the resistor 64. The network R comprises a condenser 70 having one terminal connected to a switch contact 69 engaged by the movable switch blade of the previously mentioned switch 68 when said blade is turned into its position shown in dotted lines in Fig. 1 and in full lines in Fig. 2. The second terminal of the condenser 70 is connected through a condenser 71 to the connection between the anode of the valve J and the coupling condenser 37. The condenser 70 may have a capacity of 0.0025 microfarad, and the condenser 71 may have a capacity of 0.01 microfarad. The terminal of the condenser 70 which is connected to the switch contact 69 is connected to ground by a resistor 72 which may have a resistance of one megohm. The connected terminals of the condensers 70 and 71 are connected to ground by a resistor 73 which may have a resistance of 0.25 megohm.

When the switch 68 is adjusted into the position shown in dotted lines in Fig. 1 and in full lines in Fig. 2, the network R effects a 90° phase shift of all signals applied to the control grids of the motor drive valves K and L from the amplifier valve J. In consequence, only the 90° out of phase 60 cycle no-drive stray component will then produce a motor driving torque. With the phase shifting network R connected between the valve J and the valves K and L, as shown in Fig. 2, the bucking voltage switch 66 and the slider contact 63 may be quickly and easily adjusted into their respective positions in which the motor M has no tendency to rotate. With the switch 66 and contact 63 in the respective adjustment positions then occupied by them, any 60 cycle no-drive stray signal being impressed on the valve H will be satisfactorily cancelled by the bucking signal transmitted to the cathode of the valve H through the switch 66.

In the desirable form of the invention shown in Fig. 1, the device or circuit Q forms one means, and the device or circuit P forms a second means for passing a corrective voltage into the amplifier system intermediate the input terminals of the system, to which the secondary winding of the transformer F is connected, and the output terminals of the system, to which the control winding 49 of the motor M is connected. The corrective voltages injected into the amplifying system by the devices or circuits P and Q serve complementary purposes in that the device or circuit P eliminates or reduces stray signals differing in frequency from the rebalancing or motor drive signal, while the device or circuit Q eliminates or reduces out of phase stray signals of the same frequency as the motor drive signal. Ordinarily, the operative effects of both devices or circuits P and Q are needed, but use may sometimes be made of one only of said devices or circuits.

While in accordance with the provisions of the statutes, we have illustrated and described the best form of embodiment of our invention now known to us, it will be apparent to those skilled in the art that changes may be made in the form of the apparatus disclosed without departing from the spirit of our invention as set forth in the appended claims, and that in some cases certain features of our invention may be used to advantage without a corresponding use of other features.

Having now described our invention, what we claim as new and desire to secure by Letters Patent is:

1. A self-balancing measuring and control apparatus combination comprising a normally balanced circuit network adapted to be unbalanced by a change in a voltage being measured, means for connecting a voltage source to said network for measurement of the voltage of the source, a reversible alternating current motor constructed and arranged to rebalance said network when unbalanced, a multistage amplifier including an input circuit and an output circuit and a plurality of amplifying stages including electronic valve amplifying means connected between said input and output circuits, said motor having a control winding electrically connected to said output circuit, energizing means adapted to be connected to an energizing source of alternating current and adapted, when so connected, to energize said amplifier, means impressing on said input circuit an alternating current rebalancing signal proportional in magnitude to the extent of network unbalance and dependent in phase on the direction of network unbalance and of the same frequency as the first mentioned alternating current, said amplifier being constructed and arranged to amplify said signal progressively as it passes through said amplifier from each of said stages to the next succeeding stage, and a corrective circuit having an input portion connected to the circuit of said amplifier for energization therefrom and having an output portion connected to a point in an intermediate one of said stages of said amplifier, said corrective circuit being operative to impress on said intermediate stage through said output portion a corrective signal characterized by its inability to cause operation of said motor and by its ability to cancel substantially all of a portion of the signal amplified by said amplifier which portion of the amplified signal is characterized by its inability to cause operation of said motor, whereby said portion of the amplified signal so cancelled is prevented from appearing in said output circuit of said amplifier.

2. A self-balancing measuring and control apparatus combination comprising a normally balanced circuit network adapted to be unbalanced by a change in a voltage being measured, means for connecting a voltage source to said network for measurement of the voltage of the source, a reversible alternating current motor constructed and arranged to rebalance said network when unbalanced, a multistage amplifier including an input circuit and an output circuit and a plurality of amplifying stages including electronic valve amplifying means connected between said input and output circuits, said motor having a control winding electrically connected to said output circuit, energizing means adapted to be connected to an energizing source of alternating current and adapted, when so connected, to energize said amplifier, means impressing on said input circuit an alternating current rebalancing signal proportional in magnitude to the extent of network unbalance and dependent in phase on the direction of network unbalance and of the same frequency as the first mentioned alternating current, said amplifier being constructed and arranged to amplify said signal progressively as it passes through said amplifier from each of said stages to the next succeeding stage, a first corrective circuit having an input portion connected to and adapted to be energized from said energizing means and having an output portion connected to a point in an intermediate one of said stages of said amplifier, said first corrective circuit being operative to impress on said intermediate stage through said output portion a first corrective signal of the same frequency as said first mentioned alternating current, and a second corrective circuit having an input portion connected to and energized from the output of an intermediate one of said stages of said amplifier and having an output portion connected to the input of the last mentioned intermediate stage, said second corrective circuit being operative to impress on said input of said last mentioned intermediate stage through the associated output portion a corrective signal of a frequency different from that of said first mentioned alternating current, said first and second corrective signals being characterized by their inability to cause operation of said motor, said first corrective signal also being characterized by its ability to cancel substantially all of a first portion of the signal amplified by said amplifier having the same frequency as said first mentioned alternating current and being of such a phase with respect to said first mentioned alternating current that said first portion of the amplified signal is incapable of causing operation of said motor and said second corrective signal also being characterized by its ability to cancel substantially all of a second portion of the amplified signal having the same frequency as said second corrective signal and being incapable of causing operation of said motor, whereby said first and second portions of the amplified signal are prevented from appearing in said output circuit of said amplifier.

3. A self-balancing measuring and control apparatus combination comprising a normally balanced circuit network adapted to be unbalanced by a change in a voltage being measured, means for connecting a voltage source to said network for measurement of the voltage of the source, a reversible alternating current motor constructed and arranged to rebalance said network when unbalanced, a multistage amplifier including an input circuit and an output circuit and a plurality of amplifying stages including electronic valve amplifying means connected between said input and output circuits, said motor having a control winding electrically connected to said output circuit, energizing means adapted to be connected to an energizing source of alternating current and adapted, when so connected, to energize said amplifier, means impressing on said input circuit an alternating current rebalancing signal proportional in magnitude to the extent of network unbalance and dependent in phase on the direction of network unbalance and of the same frequency as the first mentioned alternating current, said amplifier being constructed and arranged to amplify said signal progressively as it passes through said amplifier from each of said stages to the next succeeding stage, and a corrective circuit having an input portion connected to and adapted to be energized from said energizing means and having an output portion connected to a point in an intermediate one of said stages of said amplifier, said corrective circuit being operative to impress on said intermediate stage through said output portion a corrective signal of the same frequency as said first mentioned alternating current and of such a phase with respect to said first mentioned alternating current that said corrective signal is not capable of causing operation of said motor but is operative to cancel substantially all of a portion of the signal amplified by said amplifier, said portion of the amplified signal having the same frequency as said first mentioned alternating current and being of such a phase with respect to said first mentioned alternating current that said portion of the amplified signal is not capable of causing operation of said motor, whereby said portion of the amplified signal is prevented from appearing in said output circuit of said amplifier.

4. Apparatus as specified in claim 3 wherein said portion of the amplified signal is substantially 90 degrees out of phase with said rebalancing signal, and wherein said corrective circuit includes switching means adjustable to control the phase of said corrective signal to cause the latter to be substantially 180 degrees out of phase with said portion of the amplified signal.

5. Apparatus as specified in claim 3 wherein said portion of the amplified signal is substantially 90 degrees out of phase with said rebalancing signal, and wherein said corrective circuit includes switching means adjustable to control the phase of said corrective signal and also includes an electrical condenser operative to modify the phase of said corrective signal, whereby said corrective signal is caused to be substantially 180 degrees out of phase with said portion of the amplified signal.

6. Apparatus as specified in claim 3 wherein said portion of the amplified signal is substantially 90 degrees out of phase with said rebalancing signal, and wherein said corrective circuit includes switching means adjustable to control the phase of said corrective signal, an electrical condenser operable to modify the phase of said corrective signal, and variable resistance means adjustable to control the magnitude of said corrective signal, whereby said corrective signal is caused to be substantially 180 degrees out of phase with said portion of the amplified signal, and to be of such magnitude as to effect substantially complete cancellation of said portion of the amplified signal.

7. Apparatus as specified in claim 3 wherein said energizing means includes a transformer having a primary winding adapted to be connected to the energizing source of alternating current and having a secondary winding provided with a center-tap, and wherein said corrective circuit is energized from said secondary winding through said input portion, said corrective circuit including conductors connecting said intermediate stage of said amplifier to said secondary winding through said output portion and including switching means connected in circuit with said conductors and operative to connect either the portion of said secondary winding between one end thereof and said center-tap or the portion of said secondary winding between the opposite end thereof and said center-tap to said intermediate stage, said portion of the amplified signal being substantially 90 degrees out of phase with said rebalancing signal, and said corrective signal being substantially 180 degrees out of phase with said portion of the amplified signal.

8. Apparatus as specified in claim 3 wherein said intermediate stage of said amplifier includes an electronic amplifying valve having a control grid connected through a resistance to ground and having a cathode connected through a cathode resistor to ground, and wherein said corrective circuit includes conductors operative to apply said corrective signal through said output portion across said cathode resistor, said portion of the amplified signal being substantially 90 degrees out of phase with said rebalancing signal, and said corrective signal being substantially 180 degrees out of phase with said portion of the amplified signal.

9. Apparatus as specified in claim 3 wherein said energizing means includes a transformer having a primary winding adapted to be connected to the energizing source of alternating current and having a secondary winding provided with a center-tap connected to ground, wherein said corrective circuit is energized from said secondary winding through said input portion, and wherein said intermediate stage of said amplifier includes an electronic amplifying valve having a control grid connected through a resistance to ground and having a cathode connected through a cathode resistor to ground, said corrective circuit including a single pole double throw switch having a blade and a pair of cooperating contacts and including a conductor connected at one end to the end of said cathode resistor adjacent to said cathode and connected at the other end to the blade of said switch, one of the contacts of said switch being connected to one of the ends of said secondary winding through said input portion, and the other contact of said switch being connected to the other end of said secondary winding through said input portion, whereby said corrective signal is applied from one or the other half of said secondary winding through said output portion across said cathode resistor, said portion of the amplified signal being substantially 90 degrees out of phase with said rebalancing signal, and said corrective signal being substantially 180 degrees out of phase with said portion of the amplified signal.

10. Apparatus as specified in claim 3 wherein said energizing means includes a transformer having a primary winding adapted to be connected to the energizing source of alternating current and having a secondary winding provided with a center-tap connected to ground, wherein said corrective circuit is energized from said secondary winding through said input portion, and wherein said intermediate stage of said amplifier includes an electronic amplifying valve having a control grid connected through a resistance to ground and having a cathode connected through a cathode resistor to ground, said corrective circuit including a variable resistance, an electrical condenser, and a single pole double throw switch having a blade and a pair of cooperating contacts, said corrective circuit also including a conductor connected between the end of said cathode resistor adjacent to said cathode and the blade of said switch, said conductor connecting at least a portion of said variable resistance and said condenser in series between said end of said cathode resistor and said blade, one of the contacts of said switch being connected to one of the ends of said secondary winding through said input portion, and the other contact of said switch being connected to the other end of said secondary winding through said input portion, whereby said corrective signal is applied from one or the other half of said secondary winding through said output portion across said cathode resistor, said portion of the amplified signal being substantially 90 degrees out of phase with said rebalancing signal, and said corrective signal being substantially 180 degrees out of phase with said portion of the amplified signal.

11. A self-balancing measuring and control apparatus combination comprising a normally balanced circuit network adapted to be unbalanced by a change in a voltage being measured, means for connecting a voltage source to said network for measurement of the voltage of the source, a reversible alternating current motor constructed and arranged to rebalance said network when unbalanced, a multistage amplifier including an input circuit and an output circuit and a plurality of amplifying stages including electronic valve amplifying means connected between said input and output circuits, said motor having a control winding electrically connected to said output circuit, energizing means adapted to be connected to an energizing source of alternating current and adapted, when so connected, to energize said amplifier, means impressing on said input circuit an alternating current rebalancing signal proportional in magnitude to the extent of network unbalance and dependent in phase on the direction of network unbalance and of the same frequency as the first mentioned alternating current, said amplifier being constructed and arranged to amplify said signal progressively as it passes through said amplifier from each of said stages to the next succeeding stage, and a corrective circuit having an input portion connected to and energized from the output of an intermediate one of said stages of said amplifier and having an output portion connected to the input of said intermediate stage, said corrective circuit being operative to impress on said input of said intermediate stage through said output portion a corrective signal of a frequency different from that of said first mentioned alternating current and characterized by its inability to cause operation of said motor and by its ability to cancel substantially all of a portion of the signal amplified by said amplifier, said portion of the amplified signal having a frequency different from that of said first mentioned alternating current and being characterized by its inability to cause operation of said motor, whereby said portion of the amplified signal is prevented from appearing in said output circuit of said amplifier.

12. Apparatus as specified in claim 11 wherein said corrective signal includes a component having a frequency equal to twice that of said first mentioned alternating current, and wherein said portion of the amplified signal includes a component having the same frequency as the first mentioned component and being substantially 180 degrees out of phase with said first mentioned component.

13. Apparatus as specified in claim 11 wherein said corrective signal includes a component having a frequency equal to twice that of said first mentioned alternating current and also includes other components having frequencies different from those of said first mentioned alternating current and the first mentioned component, and wherein said portion of the amplified signal includes a component having the same frequency as said first mentioned component and also includes components having frequencies equal to those of the first mentioned other components, each of said components of said corrective signal being substantially 180 degrees out of phase with the particular component of said portion of the amplified signal which has the same frequency.

14. Apparatus as specified in claim 11 wherein said corrective circuit includes a tuned filter network conected between said input and output portions and operative to pass signals having frequencies other than that of said rebalancing signal from the output of said intermediate stage of said amplifier to the input of said intermediate stage, said filter network being tuned in such a manner that signals having the frequency of said rebalancing signal are substantially prevented from passing through said filter network from the output to the input of said intermediate stage.

15. Apparatus as specified in claim 11 wherein said corrective circuit includes a parallel T RC filter network connected between said input and output portions and operative to pass signals having frequencies other than that of said rebalancing signal from the output of said intermediate stage of said amplifier to the input of said intermediate stage, said filter network comprising only resistive and capacitive circuit elements the values of which are so selected that said filter network is tuned in such a manner that signals having the frequency of said rebalancing signal are substantially prevented from passing through said filter network from the output to the input of said intermediate stage.

16. Apparatus as specified in claim 11 wherein said corrective circuit includes a parallel T RC filter network connected between said input and output portions and operative to pass signals having frequencies other than that of said rebalancing signal from the output of said intermediate stage of said amplifier to the input of said intermediate stage, said intermediate stage including an electronic amplifying valve having an anode and a control electrode, both of which are connected to ground through the circuit of said amplifier, said filter network comprising two resistor elements connected in series between said anode and said control electrode, two condenser elements connected in series between said anode and said control electrode, a third condenser element connecting the connected terminals of said two resistor elements to ground, and a third resistor element connecting the connected terminals of said two condenser elements to ground, the values of said resistor and condenser elements being so selected that said filter network is tuned in such a manner that signals having the frequency of said rebalancing signal are substantially prevented from passing through said filter network from the output to the input of said intermediate stage.

17. Apparatus as specified in claim 11 wherein said corrective circuit includes a tuned filter network connected between said input and output portions and operative to pass signals having frequencies other than that of said rebalancing signal from the output of said intermediate stage of said amplifier to the input of said intermediate stage, a coupling condenser connected in series between said input portion and the output of said intermediate stage, and an isolation resistor connected in series between the input of said intermediate stage and the output of the preceding stage of said amplifier, whereby said filter network is isolated electrically from said preceding stage, said filter network being tuned in such a manner that signals having the frequency of said rebalancing signal are substantially prevented from passing through said filter network from the output to the input of said intermediate stage.

18. Apparatus as specified in claim 11 wherein said means impressing on said input circuit an alternatnig current rebalancing signal includes a periodically operated interrupting device comprising a single pole double throw switch connected in a closed circuit with said circuit network and the source of voltage to be measured, said interrupting device being operative, when said closed circuit is intact, to convert signals of the frequency of said rebalancing signal which appear in said closed circuit into stray signals in said amplifier of twice the frequency of said rebalancing signal, said stray signals constituting said portion of the signal amplified by said amplifier, and wherein said corrective signal includes a component having a frequency equal to that of said stray signals and being substantially 180 degrees out of phase with said stray signals.

19. A self-balancing measuring and control apparatus combination comprising a normally balanced circuit network adapted to be unbalanced by a change in a voltage being measured, means for connecting a voltage source to said network for measurement of the voltage of the source, a reversible alternating current motor constructed and arranged to rebalance said network when unbalanced, a multistage amplifier including an input circuit and an output circuit and a plurality of amplifying stages including electronic valve amplifying means connected between said input and output circuits, said motor having a control winding electrically connected to said output circuit, energizing means adapted to be connected to an energizing source of alternating current and adapted, when so connected, to energize said amplifier, means impressing on said input circuit an alternating current rebalancing signal proportional in magnitude to the extent of network unbalance and dependent in phase on the direction of network unbalance and of the same frequency as the first mentioned alternating current, said amplifier being constructed and arranged to amplify said signal progressively as it passes through said amplifier from each of said stages to the next succeeding stage, said amplifier including a normally operative coupling between one of said stages of said amplifier and a successive one of said stages adjacent said amplifier output circuit, means including a normally inoperative phase shifting network and a switch for rendering said normally operative coupling inoperative and for simultaneously coupling together the last mentioned two amplifier stages through said phase shifting network, a transformer having a primary winding adapted to be connected to the energizing source of alternating current and having a secondary winding provided with a center-tap, a corrective circuit including conductor means operative to connect a portion of an intermediate one of the stages of said amplifier to said secondary winding, whereby said corrective circuit is operative to apply to said portion of said intermediate amplifier stage a corrective signal of the frequency of said rebalancing signal and of such phase as to be operative to cancel substantially all of a portion of the signal amplified by said amplifier, said portion of the amplified signal having the same frequency as said rebalancing signal and being characterized by its inability to cause operation of said motor when said last mentioned two amplifier stages are coupled by said normally operative coupling and by its ability in the absence of said corrective signal to cause operation of said motor when said last mentioned two amplifier stages are coupled together through said phase shifter, and switching means included in said corrective circuit for connecting said portion of said intermediate amplifier stage between said center-tap and whichever end of said secondary winding that renders said corrective signal operative to prevent said portion of the amplified signal from causing operation of said motor when said last mentioned two amplifier stages are coupled together through said phase shifter.

RUDOLF F. WILD.
LEONARD STANTON.

No references cited.